(12) United States Patent
Spangler et al.

(10) Patent No.: US 10,689,525 B2
(45) Date of Patent: Jun. 23, 2020

(54) CORROSION PREVENTATIVE FILM

(71) Applicant: Caterpillar Inc., Deerfield, IL (US)

(72) Inventors: John M. Spangler, Peoria, IL (US); Brent Skinner, Pekin, IL (US); Anca Marcu, Peoria, IL (US); Salwa Batour Zoghbi, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/140,713

(22) Filed: Sep. 25, 2018

(65) Prior Publication Data

US 2019/0062566 A1 Feb. 28, 2019

Related U.S. Application Data

(62) Division of application No. 14/958,308, filed on Dec. 3, 2015.

(51) Int. Cl.
*C09D 5/08* (2006.01)
*C09D 5/20* (2006.01)
*C23F 11/02* (2006.01)

(52) U.S. Cl.
CPC ............ *C09D 5/082* (2013.01); *C09D 5/086* (2013.01); *C09D 5/20* (2013.01); *C23F 11/02* (2013.01)

(58) Field of Classification Search
None
See application file for complete search history.

(56) References Cited

U.S. PATENT DOCUMENTS

| | | | | |
|---|---|---|---|---|
| 3,892,670 A * | 7/1975 | White | ............... | C10M 133/02 508/250 |
| 4,792,464 A * | 12/1988 | Martenson | ............ | B05D 1/325 252/181 |
| 4,812,503 A * | 3/1989 | Baseman | ............... | C09D 5/086 523/455 |
| 2002/0078856 A1 | 6/2002 | Hahn | | |
| 2009/0020034 A1* | 1/2009 | McConnell | ............. | C23F 11/00 106/14.05 |
| 2016/0002476 A1* | 1/2016 | Breziat | ................ | C09D 5/008 428/35.8 |
| 2016/0311755 A1* | 10/2016 | McGuiness | ............. | B05D 7/00 |

* cited by examiner

*Primary Examiner* — Callie E Shosho
*Assistant Examiner* — Patrick N English
(74) *Attorney, Agent, or Firm* — Harrity & Harrity LLP

(57) ABSTRACT

A process and system to protect an apparatus such as parts, components, equipment, vehicles and the like from environmental effects such as corrosion or rust using the oil-based VCI and a water-based film. In one aspect of the disclosure, the water-based film can be applied on top of a layer of an oil-based VCI that has been applied on an apparatus such as a vehicle (described below). In other aspects of the disclosure, the oil-based VCI is mixed in with the water-based film and then applied on top of the apparatus. In still other aspect of the disclosure, the oil-based VCI is applied on top of a layer of water-based film that has been applied to the apparatus.

20 Claims, 3 Drawing Sheets

CORROSION PREVENTATIVE FILM

CROSS-REFERENCE TO RELATED APPLICATIONS

This application is a divisional of co-pending U.S. patent application Ser. No. 14/958,308 filed Dec. 3, 2015.

TECHNICAL FIELD

The disclosure relates generally to a peelable film, and more particularly, to a corrosion preventative sprayable, dipable, brushable and peelable film.

BACKGROUND

Corrosion is a byproduct of an undesirable chemical reaction when a material such as a metal having machined and/or painted surfaces is exposed to the environment. Exposure of the metal to water or water vapor can cause oxidation of the metal or rust. Corrosion can cause the structure integrity of the material to fail during use leading to unsafe conditions and can cause unsightly rust spots on the surface of the material. Further, corrosion also leads to equipment down time in order to rectify the structural integrity issues.

Volatile corrosion inhibitors (VCIs) have been used to prevent corrosion since World War II but have not worked well. VCI chemicals can be in powder, liquid, foam or sprays and are often surrounded by a film or bag. If VCIs are thinly applied, they can be easily washed away or if they are thickly applied then they are generally messy and difficult to remove.

An adhesive with additive delivery system is described in U.S. Pat. No. 5,705,566 (the '566 patent) issued on Jan. 6, 1998. The '566 patent discloses an adhesive mixture includes a block copolymer hot melt adhesive and particles of a vapor corrosion inhibitor mixed therein to protect products against corrosion. The adhesive is used to seal flaps of containers together, secure carpet to the floor of a vehicle, secure nonwoven fabric to a shrink film so that the additive is released when the shrink film is shrunk around a product to be protected, or used as an adhesive on a tape, so that the product is protected when the tape is wrapped around the product. However, the additive delivery system can fail should the film rip during use.

Accordingly, there is a need for a system that efficiently provides a water-base film that includes a VCI that will adhere to the metal even if the film is ripped or punctured.

SUMMARY

In one aspect, the disclosure is directed to a corrosion inhibiting system for a component of an apparatus that includes a peelable water-based film applied directly on to a surface of the component, and an oil-based volatile corrosion inhibitor applied directly on top of the peelable water-based film, wherein, the oil-based volatile corrosion inhibitor is configured to migrate through the peelable water-based film and come into contact with the surface of the component.

In another aspect, a corrosion inhibiting coating for a component of an apparatus that includes a peelable water-based film mixed with an oil-based volatile corrosion inhibitor, wherein the peelable water-based film includes about 0.05% to 10% by weight of amine salt and wherein the oil-based volatile corrosion inhibitor is about 0.05% to 40% by weight and a remainder is the peelable water-based film, wherein an application of the peelable water-based film and the oil-based volatile corrosion inhibitor prevents corrosion better than the peelable water-based film alone.

DETAILED DESCRIPTION

Figure 1:
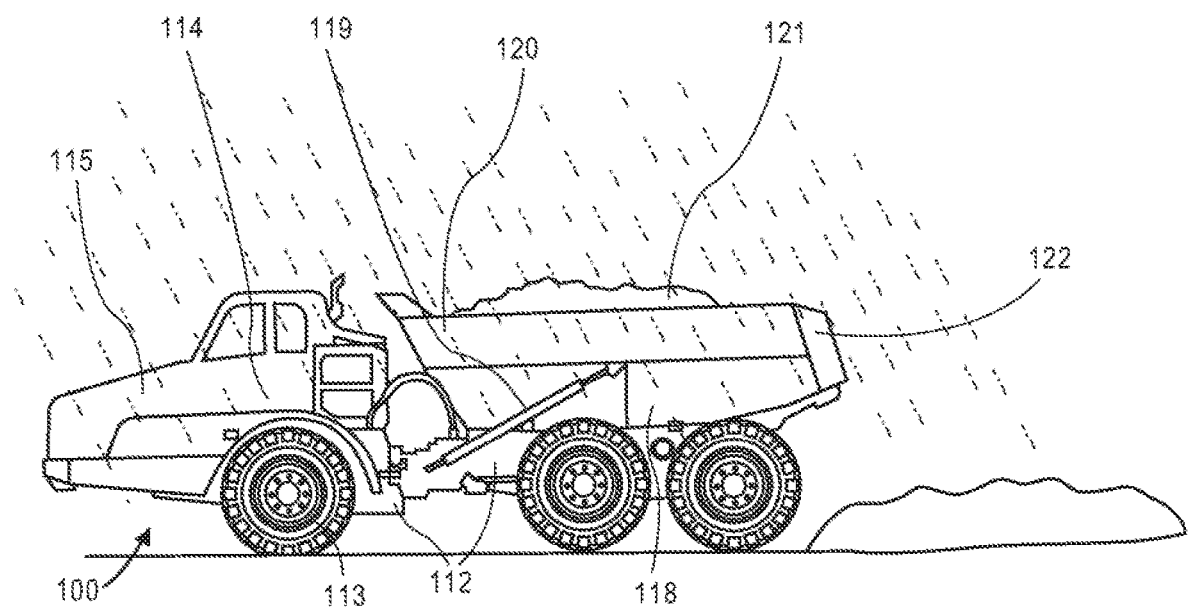
FIG. 1 is an illustration of an exemplary vehicle that can be protected from corrosion using the process and system according to the disclosure.

The disclosure sets forth a process and system to protect an apparatus such as parts (e.g. machined, plated or painted), fasteners, components, equipment, vehicles and the like from environmental effects such as corrosion or rust using the oil-based VCI and a water-based peelable film. In one aspect of the disclosure, the water-based film can be applied on top of a layer of an oil-based VCI that has been applied on an apparatus such as a vehicle (described below). In other aspects of the disclosure, the oil-based VCI is mixed in with the water-based film and then applied on top of the apparatus. In still other aspect of the disclosure, the oil-based VCI is applied on top of a layer of water-based film that has been applied to the apparatus.

The water-based film can be any film that can cover the apparatus and allows for molecules of the oil-based VCI to permeate to the metal and corrosive gases to travel out of the film. Examples include resins such as cellulose, vinyl chloride, acrylic, colloidal acrylic dispersions, polyurethane dispersions, polyethylene, natural or synthetic latexes, acrylic resins, acrylic copolymers such as styrene-acrylates, butadiene-acrylates, vinyl chloride-acrylates, polyvinylidene chloride-acrylates, vinyl acetate-acrylates, polyvinyl-styrene butadiene copolymers, polyvinyl butyrals, polyisocyanates, polycondensate type aliphatic polyurethanes such as anionic, cationic, non-ionic or amphoteric polyurethanes, acrylic polyurethanes, polyester-polyurethanes, mixtures thereof and the like.

In one embodiment, the water-based film is peelable, brushable, sprayable, dipable and the like. Components of the water-based film may include water (distilled, filtered, tap or the like) between about 40% to 70% by weight, polyacrylate between about 30% to 60% by weight, and carboxylic acid amine salt between about 0.05% to 10% by weight. Other films composition may be a blend of non-volatile components comprising about 41-71% by weight of the coating composition, including about 30-60% by weight resin component; about 6-17% by weight release aids; about 0.1-0.9% by weight wetting aids; about 0.1-0.9% by weight defoamer; about 0.1-0.9% by weight dispersing aids; and about 1-7% by weight thickeners; the strippable coating composition also comprising about 20-56% by weight of the coating composition of volatile components, including:

about 0.1-2.9% by weight plasticizers and coalescents; and about 26.0-60% by weight of water.

Oil-based VCI may be any type of oil-based VCI including ones using petroleum and mineral oil. In some embodiments, oil-based VCI may include Daubert NOX Rust 1100, Chemtool VCI-F, RustX 400AEX, Cortec VpCI 322, Cortec VpCI 705 and the like. The oil-based VCI may be brushed, sprayed, dipped, fogged, sprinkled, mixed, poured, rolled and the like on to, under or mixed in with the water-based film. These oil-based VCI act as inhibitors or barriers that protect the metal surfaces of the apparatus from environmental corrosion at the molecular level. Additionally, oil-based VCI do not interfere with the operation of mechanical components.

FIG. 1 is an illustration of an exemplary vehicle 100 that can be protected from corrosion using the process and system according to the disclosure. Alternatively, components of the vehicle 100 can also be protected before it is shipped to a repair facility where the vehicle is being repaired. The vehicle 100 can be any vehicle such as a wheeled dump truck or any off-highway vehicle being used in various environments. The vehicle 100 is shown to include a chassis 112. The chassis 112 may be supported by wheels 113 (or tracks on other locomotion devices), and itself support an operator cabin 114 and an engine 115. A dump body 118 may be positioned above an actuator system 119, with both being supported by the chassis 112, as well. The actuator system 119 may include one or more hydraulic cylinders (not shown) to raise and lower the dump body 118 at a proximal end 120, and thereby inclining the dump body 118 in order to expel a payload 121 at a distal end 122.

VCI on Top of Film-Test 1

Figure 2:
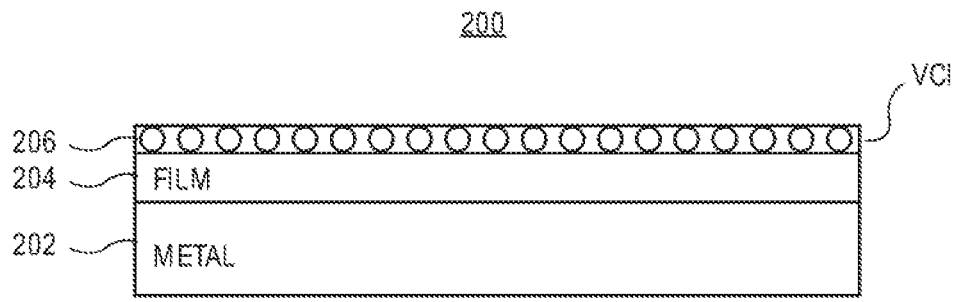
FIG. 2 is a side view of metal panel having the water-based film directly on top thereof and the oil-based VCI directly on top of the water-based film according to the disclosure.

FIG. 2 is a side view 200 of metal panel 202 having the water-based film 204 directly on top thereof and the oil-based VCI 206 directly on top of the water-based film. The metal panel 202 can be any type of metal including stainless steel, aluminum, nickel alloys, duplex alloys, super stainless grades, alloy steel, titanium and the like. In one aspect of the disclosure, the metal panel may be dipped or sprayed with a cleaning solution known in the art, such as a solvent or an alcohol so that there is good adhesion surface on the metal panel 202.

The peelable water-based film was applied by brush onto metal panel 202 for a predetermined period of time is allowed to pass to allow the peelable water-based film to set or cure. The predetermine period of time may include 4 hours for one set A-a and 24 hour for the set A-b. 8 drops (0.1 ml) of the selected VCI oil was applied and spread on top of the peelable water-based film with a foam brush. In other aspects of the disclosure, any amount of time for the film to set or cure can be used including for about 1-12 hours, 1-36 hours, 20-36 hours and the like. In one aspect, the VCI oil was brushed several times in order to attempt to achieve an evenly spread the VCI oil on the film.

Test Procedures 22 (4×8 inch) metal panels were provided and/or prepared through a cleaning solution. Two metal panels for each VCI oil and 2 control metal panels (4 hours and 24 hours) that have just the peelable water-based film through a brush application were prepared.

Applied peelable water-based film with a foam brush directly onto the metal panels and let them set or cure for 4 hours for set A-a and 24 hours for set A-b.

Brush on 8 drops of VCI oil from a dispenser directly on top of the peelable water-based film with a foam brush.

The metal panels were placed outside for the field testing and exposed to the environment.

The metal panels were inspected every 24 hours for signs of rust or corrosion. For the experiments, positive corrosion or rust is defined as having at least three visible signs (spots, streaking, etc.) of rust using normal vision (i.e. 20/20). In other words, not using a microscope, magnifying glass and the like to enhance normal vision.

Results

Control panels (4 and 24 hours) showed rust after 144 hours and all the others panels rusted after 288 in both set A-a and A-b, except for Nox-Rust 1100 that rusted after 384 hours in set A-a. However, in set A-b the same product (Nox-Rust 1100) rusted after 312 hours. Further, waiting an additional 20 hours after applying the peelable water-based film did not seem in general to increase the rust protection time.

TABLE 1

Results of Test 1-Set Aa & Ab

| Sample | Panels Prepared | Results after |
|---|---|---|
| Set A-a Peelable Film and VCI Oil @ 4 hours | | |
| Peelable and Nox-Rust 1100 @4 h | 2 | Rust after 384 hours |
| Peelable and VCI-F @4 h | 2 | Rust after 288 hours |
| Peelable and Rust X 400AEX @4 h | 2 | Rust after 288 hours |
| Peelable and VpCI 322 @4 h | 2 | Rust after 288 hours |
| Peelable and VpCI 705 @4 h | 2 | Rust after 288 hours |
| Peelable Control @4 h | 1 | Rust after 144 hours |
| Set A-b Peelable Film and VCI Oil @ 24 hours | | |
| Peelable and Nox-Rust 1100 @ 24 h | 2 | Rust after 312 hours |
| Peelable and VCI-F @ 24 h | 2 | Rust after 288 hours |
| Peelable and Rust X 400AEX @ 24 h | 2 | Rust after 288 hours |
| Peelable and VpCI 322 @ 24 h | 2 | Rust after 288 hours |
| Peelable and VpCI 705 @ 24 h | 2 | Rust after 288 hours |
| Peelable Control @24 h | 1 | Rust after 144 hours |

Conclusion

After the film, was removed (See FIG. 5), a thin film of the oil-based VCI was unexpectedly found underneath the film and thus seemed to help to form a barrier against corrosion. The results shown above were unexpected as the film is water-based and the VCI is oil-based and it is known that oil and water don't mix well together and tend to separate from each other. This is because water molecules are polar. That is one end has a slight negative charge while the other end has a slight positive charge. Those charges let the molecules form hydrogen bonds and attach to other molecules that are polar, including other water molecules. Oil molecules, however, are non-polar, and they can't form hydrogen bonds. If you put oil and water in a container, the water molecules will bunch up together and the oil molecules will bunch up together, forming two distinct layers.

Thus, the oil-based VCI should have remained on the surface of the water-based film or repelled instead of permeating through the film and ultimately be underneath it. It is possible that the water in the water-based film evaporated in some portions of the film and thus, allowing the oil-based VCI to permeate there through towards the metal surface. Further, the oil-based VCI on top of the water-based film afforded better protection than the film by itself.

VCI Mixed With Film-Test 2

Figure 3:
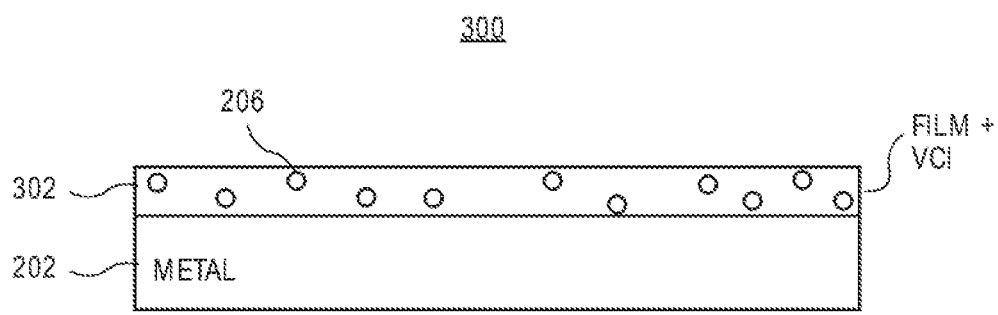
FIG. 3 is a side view of oil-based VCI mixed in with the water-based film and then the mixed film is applied to the metal panel according to the disclosure.

FIG. 3 is a side view 300 of oil-based VCI mixed in with the water-based film and then the mixed film 302 is applied to the metal panel 202 according to the disclosure. A mixture of 3% and 25% by weight of the selected oil-based VCI with the remainder being about 75-97% by weight of peelable water-based film. However, any amount from about 0.05% to 40% or more of VCI by weight with the remainder of about 60% to 99.95% by weight may be used according to certain aspects of the disclosure. The peelable water-based film may be supplied in liquid form for easy mixing with the oil-based VCI. After mixing, the mixed film is brushed onto the metal panel 202. In another aspect, the mixed film may be dipped or sprayed on the metal panel 202.

Test Procedures 21 (4×8 inch) metal panels were provided and/or prepared through a cleaning solution.

Oil-based VCI at 3% and 25% were respectively mixed with peelable water-based film. Mixing may be made by any known method including hand mixing with a wooden spoon in a beaker, or using a hand held mixing device placed in a beaker and the like. Appropriate amount of time of mixing was used in order for the oil-based VCI to properly mix with the peeable water-based film.

Applied mixture by brush directly onto the metal panels. Alternatively, the mixture may be sprayed or dipped. Two metal panels of each VCI oil of different concentrations and 2 control metal panels that have just the peelable water-based film were used.

The metal panels with the applied mixed film were allowed to dry for 24 hours inside.

After 24 hours, the metal panels were placed outside for the field testing and exposure to the environment.

The metal panels were inspected every 24 hours for signs of corrosion.

Results

Two of the control metal panels showed rust after 168 hours. The 3% VCI oil mixtures have not rusted after 500 plus hours. However, out of the 25% VCI oil mixtures the Nox-Rust 1100 and VpCI322 have not rusted after 500 plus hours.

TABLE 2

Results of Test 2

| a. Sample | Panels Prepared | Results |
| --- | --- | --- |
| Mixture @ 3% VCI Oil | | |
| Peelable + 3% Nox-Rust 1100 | 2 | No Rust after 500 hours |
| Peelable + 3% VCI-F | 2 | No Rust after 500 hours |
| Peelable + 3% Rust-X 400 AEX | 2 | No Rust after 500 hours |
| Peelable + 3% VpCI 322 | 2 | No Rust after 500 hours |
| Peelable + 3% VpCI 705 | 2 | No Rust after 500 hours |
| Peelable Control | 1 | Rust after 168 hours |
| Mixture @ 25% VCI Oil | | |
| Peelable + 25% Nox-Rust 1100 | 2 | No Rust after 500 hours |
| Peelable + 25% VCI-F | 2 | Rust after 336 hours |
| Peelable + 25% Rust-X 400 AEX | 2 | Rust after 336 hours |
| Peelable + 25% VpCI 322 | 2 | No Rust after 500 hours |
| Peelable + 25% VpCI 705 | 1 | Rust after 360 hours |
| Peelable Control | 1 | Rust after 168 hours |

Conclusion

It was expected that the 25% mixture should have performed consistently best overall given the higher percentage of the oil-based VCI but two of the panels VCI-F and Rust-X 400 AEX rusted after 336 hours while the same VCIs at 3% didn't rust after 500 plus hours. More consistent overall performance was seen at the lower mixture level of 3%. Thus, at least between 3% and 25% by weight of the oil-based VCI mixed with the water-based film offered better corrosion protection than the water-based film alone.

Figure 4:
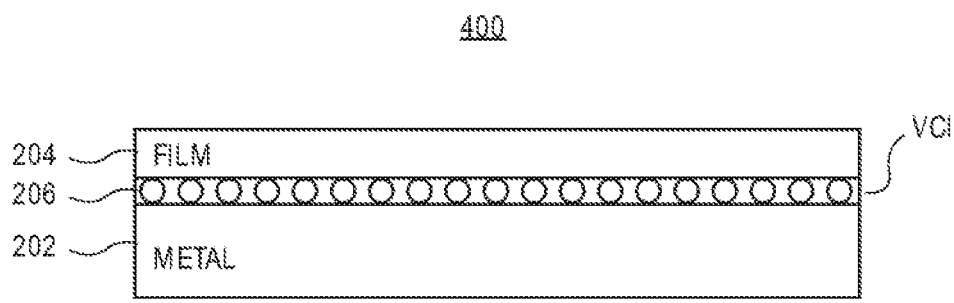
FIG. 4 is a side view of oil-based VCI applied to the metal panel and then the water-based film applied on top according to the disclosure.

Film Applied on Top of VCI-Test 3 FIG. 4 is a side view 400 of oil-based VCI applied to the metal panel 202 and then the water-based film applied on top according to the disclosure. The selected oil-based VCI was brushed on top of the metal panel 202 and then peelable water-based film was applied to cover the VCI.

Test Procedures 12 (4×8 inch) metal panels were provided and/or prepared through a cleaning solution.

Brush on a thin layer of selected oil-based VCI directly onto the metal panels and let it set for 30 minutes. Two metal panels were used for each of the selected oil-based VCI.

Brush peelable water-based film directly on top of the selected VCI layer.

Two control metal panels that have just the peelable water-based film were also prepared.

The metal panels were placed outside for the field testing and subjected to the environment.

The panels have been inspected every 24 hours for signs of corrosion.

Results

All panels, including control panels, showed rust after 144 hours except for VCI-F.

TABLE 3

Results of Test 3-Set C

| Sample | Panels Prepared | Results after |
| --- | --- | --- |
| Nox-Rust 1100 + Peelable | 2 | Failed after 144 hours |
| VCI-F + Peelable | 2 | Failed after 384 hours |
| Rust X400 AEX + Peelable | 2 | Failed after 144 hours |
| VpCI 322 + Peelable | 2 | Failed after 144 hours |
| VpCI 705 + Peelable | 2 | Failed after 144 hours |
| Peelable control | 2 | Failed after 144 hours |

Conclusion

Since the oil-based VCI were applied directly to the metal panels and then "sealed" with the water-based film, it should have afforded the best corrosion protection of the three different applications discussed herein. This is because VCIs are attracted to metal surfaces. Although it appears that VCI-F did better than the remaining 4 selected VCI, no additional protection from corrosion were afforded than having the film by itself.

Figure 5:
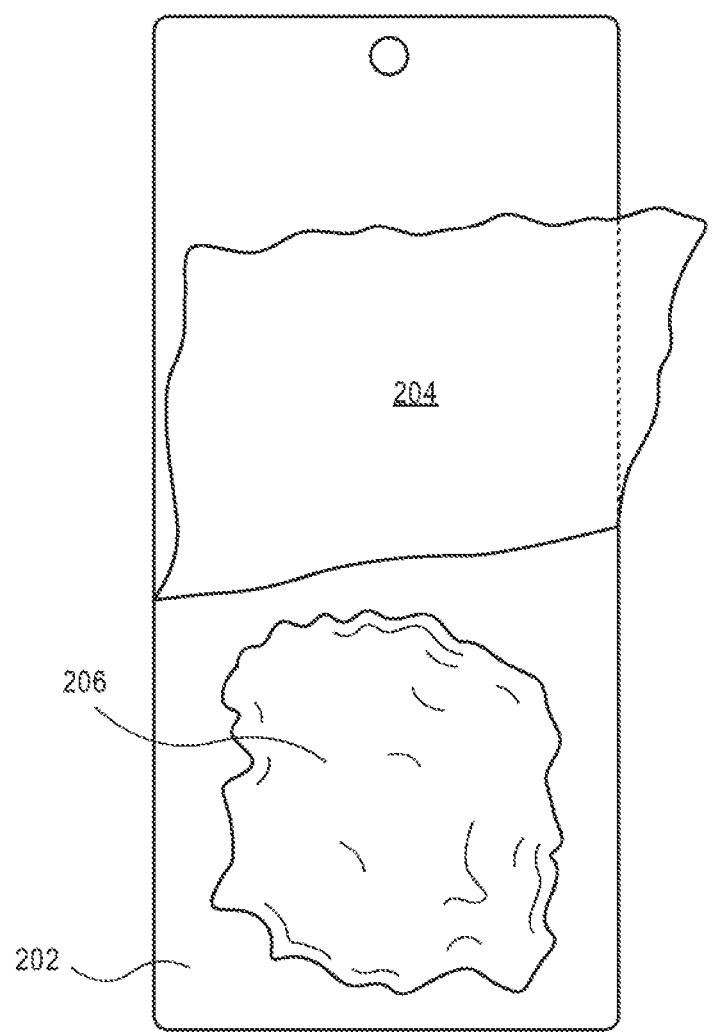
FIG. 5 illustrates the water-based film being removed after the process of FIG. 2 according to the disclosure.

FIG. 5 illustrates the water-based film 204 being removed after the process of FIG. 2 according to the disclosure. In that process, the oil-based VCI was applied on top of the water-based film 204 that was directly applied to the metal panel 202. After removal of the water-based film, a thin protective layer of the oil-based VCI was unexpectedly found on top of the metal panel 202.

Thus, as the data shown above, mixing the VCI with the film seems to yield the best results overall. The second best overall results were from applying the VCI on top of the film that is on top of the metal panel. The VCI and film combination may be applied to any portion of the apparatus including where joints are formed between two parts or on the fasteners.

INDUSTRIAL APPLICABILITY

The disclosure may be applicable to any apparatus including parts (e.g. machined, plated or painted), fasteners, vehicles, components and the like in order to protect the apparatus from harsh environments that may cause corrosion. Corrosion of rust can compromise the physical integrity of the apparatus causing it to fail or can compromise the appearance of the apparatus making it look displeasing to the user of the apparatus.

In one aspect, a water-based peelable film may be applied to the surface of the apparatus and then an oil-based VCI may be applied on top of the water based film via brushing, pouring, spraying, rolling and the like. The water-based film may be applied on top of the surface of the apparatus and then after a predetermined period of time, the oil-based VCI may be applied on top.

In another aspect, the oil-based VCI and the water-based peelable film may be mixed together at different concentrations of the VCI and then the mixed film may be applied on a surface of the apparatus. The use of VCI with the film yielded better corrosion protection than the film alone.

In still another aspect, the oil-based VCI may be applied to the top of the surface of the apparatus and then the VCI is covered with the water-based film.

The many features and advantages of the disclosure are apparent from the detailed specification, and thus, it is intended by the appended claims to case all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

We claim:

1. A corrosion inhibiting coating for a component of an apparatus, comprising:
   a peelable water-based film forming coating mixed with an oil-based volatile corrosion inhibitor,
      wherein the peelable water-based film forming coating comprises one or more of a colloidal acrylic dispersion, a polyurethane dispersion, a natural or synthetic latex, a styrene-acrylate, a butadiene-acrylate, a vinyl chloride-acrylate, a polyvinylidene chloride-acrylate, a vinyl acetate-acrylate, a polyvinyl-styrene butadiene copolymer, a polyvinyl butyral, a polyisocyanate, a polycondensate aliphatic polyurethane, an acrylic polyurethane, or a polyester-polyurethane,
      wherein the peelable water-based film forming coating includes 0.05% to 8% by weight of amine salt,
      wherein the oil-based volatile corrosion inhibitor is 15% to 40% by weight and a remainder is the peelable water-based film forming coating, and
      wherein an application of the peelable water-based film forming coating and the oil-based volatile corrosion inhibitor prevents corrosion better than the peelable water-based film forming coating alone.

2. The corrosion inhibiting coating of claim 1, wherein the corrosion inhibiting coating is brushable onto the component.

3. The corrosion inhibiting coating of claim 1, wherein the corrosion inhibiting coating is sprayable onto the component.

4. The corrosion inhibiting coating of claim 1, wherein the corrosion inhibiting coating is dippable onto the component.

5. The corrosion inhibiting coating of claim 1, wherein the oil-based volatile corrosion inhibitor is 25% by weight.

6. The corrosion inhibiting coating of claim 1, wherein the component is a metal panel.

7. The corrosion inhibiting coating of claim 1, wherein the oil-based volatile corrosion inhibitor includes petroleum.

8. The corrosion inhibiting coating of claim 1, wherein the oil-based volatile corrosion inhibitor includes mineral oil.

9. The corrosion inhibiting coating of claim 1, wherein a cleaning solution is applied on the component before the application of the peelable water-based film forming coating and the oil-based volatile corrosion inhibitor.

10. The corrosion inhibiting coating of claim 1, wherein the component is dried for twenty-four hours after the application of the peelable water-based film forming coating and the oil-based volatile corrosion inhibitor.

11. A method comprising:
    mixing a peelable water-based film forming coating with an oil-based volatile corrosion inhibitor to obtain a mixture of the peelable water-based film forming coating and the oil-based volatile corrosion inhibitor,
       wherein the peelable water-based film forming coating comprises one or more of a colloidal acrylic dispersion, a polyurethane dispersion, a natural or synthetic latex, a styrene-acrylate, a butadiene-acrylate, a vinyl chloride-acrylate, a polyvinylidene chloride-acrylate, a vinyl acetate-acrylate, a polyvinyl-styrene butadiene copolymer, a polyvinyl butyral, a polyisocyanate, a polycondensate aliphatic polyurethane, an acrylic polyurethane, or a polyester-polyurethane,
       wherein the peelable water-based film forming coating includes 0.05% to 8% by weight of amine salt, and
       wherein the oil-based volatile corrosion inhibitor 15% to 40% by weight and a remainder is the peelable water-based film forming coating; and applying, onto a surface of a component, the mixture of the peelable water-based film forming coating and the oil-based volatile corrosion inhibitor,
       wherein the application of the mixture of the peelable water-based film forming coating and the oil-based volatile corrosion inhibitor prevents corrosion better than the peelable water-based film forming coating alone.

12. The method of claim 11, wherein the component is a metal panel.

13. The method of claim 11, wherein the peelable water-based film forming coating is in liquid form.

14. The method of claim 11, wherein applying the mixture of the peelable water-based film forming coating and the oil-based volatile corrosion inhibitor comprises:
    brushing, onto the surface, the mixture of the peelable water-based film forming coating and the oil-based volatile corrosion inhibitor.

15. The method of claim 11, wherein applying the mixture of the peelable water-based film forming coating and the oil-based volatile corrosion inhibitor comprises:
    spraying, onto the surface, the mixture of the peelable water-based film forming coating and the oil-based volatile corrosion inhibitor.

16. The method of claim 11, further comprising:
    spraying the surface with a cleaning solution before applying the mixture of the peelable water-based film forming coating and the oil-based volatile corrosion inhibitor.

17. The method of claim 11, wherein the oil-based volatile corrosion inhibitor includes petroleum.

18. The method of claim 11, wherein the oil-based volatile corrosion inhibitor includes mineral oil.

19. The method of claim 11, wherein the oil-based volatile corrosion inhibitor is 25% by weight.

20. The method of claim 11, further comprising:
    drying, for twenty-four hours and after the application of the mixture of the peelable water-based film forming coating and the oil-based volatile corrosion inhibitor, the component.

* * * * *